US006764059B2

(12) United States Patent
Cleereman et al.

(10) Patent No.: US 6,764,059 B2
(45) Date of Patent: Jul. 20, 2004

(54) VALVE ISOLATION SYSTEM

(75) Inventors: Douglas P. Cleereman, Greendale, WI (US); Jonathan B. Johnson, Milwaukee, WI (US); Carmen F. Bucher, Waukesha, WI (US); Dennis J. Rygiewicz, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 154 days.

(21) Appl. No.: 10/260,097

(22) Filed: Sep. 27, 2002

(65) Prior Publication Data

US 2004/0061088 A1 Apr. 1, 2004

(51) Int. Cl.[7] ................................................ F16K 31/02
(52) U.S. Cl. ................................ 251/129.04; 137/532
(58) Field of Search ....................... 257/129.04, 129.15; 137/552, 557

(56) References Cited

U.S. PATENT DOCUMENTS 4,926,903 A * 5/1990 Kawai .................. 251/129.04
5,305,791 A * 4/1994 Kowalchuk ................ 137/554
5,465,757 A * 11/1995 Peters .................. 251/129.04
5,730,165 A * 3/1998 Philipp ................. 251/129.04
6,554,248 B2 * 4/2003 Taniguchi et al. ..... 251/129.04

OTHER PUBLICATIONS

Product literature concerning Serpar® Crossflow Double Valves and CrossMirror® Double Valves by Ross Controls, admitted prior art.

* cited by examiner

*Primary Examiner*—John Bastianelli
(74) *Attorney, Agent, or Firm*—Quarles & Brady LLP; Alexander M. Gerasimow

(57) ABSTRACT

A system and method for controlling and monitoring operation of a valve are disclosed. The system includes an actuator and a switch that, upon being actuated, provides a control signal to the actuator designed to cause the valve to change from a first state to a second state. The system further includes a sensor positioned downstream of the valve, an indicator, and a detection device coupled at least indirectly to the switch, the sensor and the indicator. When not detecting a sensor failure, the detection device allows the indicator to indicate that the valve has changed its state in response to the switch being actuated when the sensor indicates that the valve has so changed. Upon detecting a sensor failure, the detection device prevents the indicator from indicating that the valve has changed its state in response to the switch being actuated.

20 Claims, 2 Drawing Sheets

VALVE ISOLATION SYSTEM

CROSS-REFERENCE TO RELATED APPLICATIONS

1. Field of the Invention

The present invention relates to systems that employ hydraulic, pneumatic or other types of valves and, in particular, relates to systems for controlling and monitoring the operation of such valves.

2. Background of the Invention

In many industrial and other systems, hydraulic, pneumatic or other types of valves are employed to turn a machine off and on. Such valves can be employed either singly, or in redundant pairs in order to limit the impact that any single failure of a single valve could have upon the overall system's operation.

The machine(s) downstream of the valve(s) sometimes need servicing. Typically the valve(s) must be turned off before the machines can be serviced. Therefore, before a person accesses the machine to perform such a repair, it is desirable to verify that the fluid pressure to the machine has been shut off. For example, it is desirable that a signal be provided indicating that the fluid pressure has been successfully shut off.

A pressure sensor, or more than one redundant pressure sensor, can be positioned to determine whether the fluid pressure has been shut off. Nevertheless, such pressure sensors can themselves occasionally malfunction. For example, a pressure sensor output contact designed to open when the fluid pressure is above or below a given threshold may become welded in a particular state. Also, the sensor may become stuck or broken.

If the signal indicating whether the fluid pressure has been successfully shut off is based upon such a welded pressure sensor output, the signal may incorrectly indicate that the fluid pressure has been shut off even when this is not the case. Also, because of redundancy within the system design, it is possible that the malfunctioning sensor would go undetected (and erroneous signals would be provided) for a long period of time. Additionally, when multiple pressure sensors are being employed, it may be difficult to determine which of the multiple pressure sensors is malfunctioning even when it is realized that one of the sensors is malfunctioning.

Therefore, it would be advantageous if a system could be developed for controlling and monitoring the status of valves in a system employing hydraulic, pneumatic or other types of valves. In particular, it would be advantageous if the control/monitoring system avoided providing an indication that the valves were closed in situations where one of the pressure sensors used to determine the valves' status was malfunctioning. Additionally, it would be advantageous if, in the case of a failure of one of the pressure sensors, the control/monitoring system was able to prohibit the servicing of the machine (at least by providing a signal indicating to a technician that he or she should not be servicing the machine). Further, it would be advantageous if the control/monitoring system was able to provide information that could be used to identify the malfunctioning pressure sensor or the valve. Additionally, it would also be advantageous if such a control/monitoring system could be developed that was not significantly expensive to implement.

BRIEF SUMMARY OF THE INVENTION

The present inventors have discovered a new system for controlling and monitoring a valve system that is capable of determining whether a malfunction has occurred in a pressure sensor used to determine valve status. In addition to the pressure sensor(s) themselves, actuator(s) for the valve(s), and a switch or turning on and off the valve(s), the control/monitoring system further includes a detection device/circuitry that monitors the behavior of the sensors. When a sensor malfunction is detected, the detection device precludes the overall control/monitoring system from indicating that the valve(s) have been closed/isolated, even though the valve(s) may in fact be shut off, which is indicative of the sensor malfunction. Depending upon the number and configuration of indications that are provided by the control/monitoring system, the system is further able to provide an indication of which of the pressure sensors is malfunctioning.

In at least some embodiments of the control/monitoring system, each of the pressure sensors includes multiple contacts that are actuated in response to changes in the pressure being sensed by the sensors. In order for the system to provide an indication that valve(s) of the valve system have been turned off (isolated), the pressure sensors must first be in a first state when the valve(s) are turned off, where that first state is indicative that the valve(s) are open, and then the pressure sensors must switch to a second state that is indicative that the valve(s) have been closed. By requiring that the pressure sensors both begin in the first state but then switch to the second state, the control/monitoring system guarantees that the pressure sensors are properly sensing and responding to changes in the delivered pressure, such that it is appropriate to output indications of valve status based upon the output of the pressure sensors.

In particular, the present invention relates to a system for controlling and monitoring the operation of a valve. The system includes a valve actuator and a switch that, upon being actuated, provides a control signal to the valve actuator designed to cause the valve to change from a first valve state to a second valve state. The system further includes a first sensor positioned downstream of the valve, a first output indicator, and a sensor failure detecting device coupled at least indirectly to the switch, the first sensor and the first output indicator. When not detecting a sensor failure, the sensor failure detecting device allows the first output indicator to indicate that the valve has changed from the first valve state to the second valve state in response to the switch being actuated when the sensor indicates that the valve has so changed. Upon detecting a sensor failure, the sensor failure detecting device prevents the output indicator from indicating that the valve has changed from the first valve state to the second valve state in response to the switch being actuated.

The present invention further relates to a system comprising a flow-governing device, an actuator for controlling a status of the flow-governing device, and first and second sensors that operate to sense the status of the flow-governing device. The system further includes means for receiving commands to change the status of the flow-governing device, for providing a control signal to the actuator in response to the received commands, for receiving signals from the sensors, for detecting when a sensor malfunction has occurred, and for providing at least one output indication indicative of the sensor malfunction when the sensor malfunction has occurred.

The present invention additionally relates to a method of monitoring whether a valve has been shut off in response to a command. The method includes causing at least one switching element of an electric circuit to change a state in response to the command. The method further includes energizing a coil in response to the changing of the state of the at least one switching element, where the energizing of the coil only occurs if a sensor component is in a first position indicating that the valve has not been shut off. The method additionally includes energizing an indicator light in response to the energizing of the coil, where the energizing of the indicator light only occurs if the sensor component switches, subsequent to the energizing of the coil, from the first position to a second position indicating that the valve has been shut off.

DETAILED DESCRIPTION OF THE INVENTION

Figure 1:
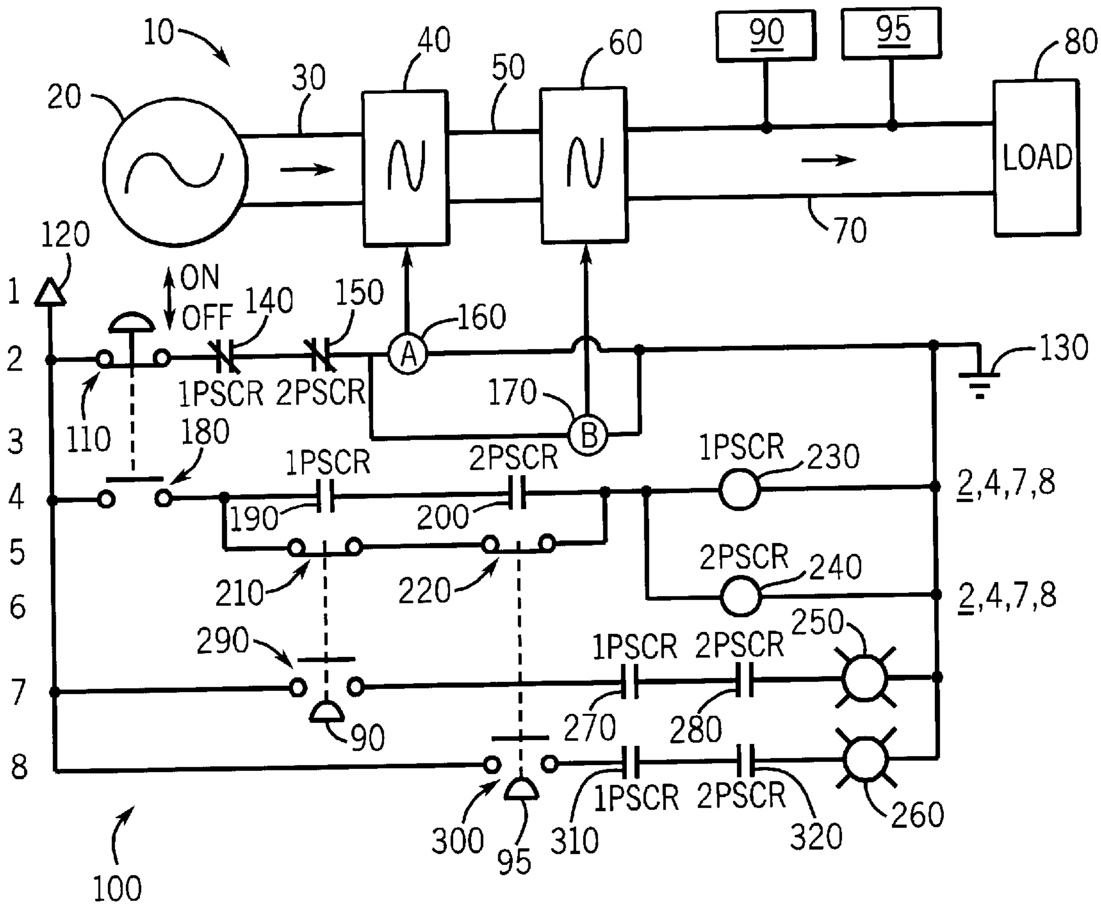
FIG. 1 is a ladder diagram showing a first embodiment of a valve control/monitoring system that avoids inaccurate indications of a valve being closed despite a sensor malfunction.

Referring to FIG. 1, components of an exemplary valve system 10 are shown to include a pump (or other fluid source) 20 connected by way of a first passage 30 to a first valve 40, which in turn is coupled by a second passage 50 to a second (redundant) valve 60. The valves 40, 60 can be hydraulic, pneumatic, or other types of valves. The second valve 60 in turn is coupled by way of a third passage 70 to a load 80. The fluid pressure within the third passage 70 is sensed by way of first and second pressure sensors 90 and 95, respectively. The output of the pressure sensors 90 and 95 represents the status of the first and second valves 40, 60 and, in particular, indicates whether the valves have been properly closed (shut off) or opened. In some embodiments, the sensors 90, 95 each can take on two states depending upon whether the sensed fluid pressure is above or below respective thresholds (each sensor may have the same or a different threshold).

Further as shown in FIG. 1, the first and second pressure sensors 90 and 95 form part of a larger control/monitoring system 100 that is used to determine the status of the valves 40 and 60 and provide accurate indications to an operator, technician or other person (or other system) of the status of the valves 40,60. In particular, the control/monitoring system 100 is designed to be able to provide an indication of whether the valves 40, 60 have been properly closed, such that a technician can appropriately access the system downstream of those valves. Further, the control/monitoring system 100, which is shown in ladder diagram format, is designed to avoid providing indications that the valves 40, 60 are closed when the valves are still open, even though one of the pressure sensors 90, 95 has malfunctioned.

As shown, in the present embodiment of the control/monitoring system 100, an on/off push/pull switch 110 is coupled in series in between a power source 120 and a ground 130 in series with a first normally-closed contact 140, a second-normally closed contact 150 and the parallel combination of a first actuator 160 for the first valve 40 and a second actuator 170 for the second valve 60. When the switch 110 is in its on position (pulled), assuming that each of the first and second normally closed contacts 140 and 150 are in their normal (closed) positions, power is provided to each of the actuators 160 and 170, which should cause each of the valves 40 and 60 to open and thereby allow fluid flow. In one embodiment, the actuators 160 and 170 can be solenoids. In alternate embodiments, other types of actuators can be employed.

As shown at line 4 of the ladder diagram, turning off the switch 110 (pushing) causes a contact 180 to be closed. The contact 180 is connected in series, between the power source 120 and the ground 130, along with several other components. Specifically, a first normally-open contact 190 and a second normally-open contact 200 are coupled in series with one another, and the series combination of those contacts is coupled in parallel with the series combination of a first pressure switch contact 210 and a second pressure switch contact 220 (the contacts 210,220 are respectively parts of the sensors 90,95). The parallel combination of these pairs of components 190, 200 and 210, 220 is coupled in series between the contact 180 and another parallel combination of first and second coils 230 and 240, respectively, which in turn are coupled to the ground 130. The first coil 230 actuates each of the first normally-open contact 190 and the first normally-closed contact 140, while the second coil 240 actuates each of the second normally-open contact 200 and the second normally-closed contact 150.

The first pressure switch contact 210 is designed to be closed when the first pressure sensor 90 detects fluid pressure above its threshold, and the second pressure switch contact 220 is designed to be closed when the second pressure sensor 95 detects fluid pressure above its threshold. Consequently, when the switch 110 is in its on state such that the first and second valves 40 and 60 are opened, each of the pressure sensors 90, 95 should be sensing fluid flow and consequently each of the pressure switch contacts 210 and 220 should be closed.

When the switch 110 is turned off, such that the contact 180 is closed, several things occur. First, the turning off of the switch 110 causes the actuators 160 and 170 to be deprived of power, which should cause each of the valves 40 and 60 to close. Secondly, although the valves 40 and 60 are turned off, the pressure sensors 90,95 do not immediately experience a decrease in fluid pressure, and consequently the pressure switch contacts 210 and 220 continue to remain closed for a short period of time thereafter due to the residual pressure within the third passageway 70. Therefore, when the switch 110 is turned off and the contact 180 is closed, power is provided to the first and second coils 230 and 240 by the way of the pressure switch contacts 210 and 220. The energizing of the coils 230 and 240 causes the first and second normally-closed contacts 140,150 to open, further reinforcing the off status of the actuators 160 and 170, and additionally causes the first and second normally-open contacts 190, 200 to close. Because the first and second normally-open contacts 190, 200 are closed, power continues to be delivered to the coils 230 and 240 even after the residual pressure has dropped within the third passage 70 and the pressure switch contacts 210, 220 are opened.

Assuming normal operation, the shutting off of the valves 40, 60 is complete as of this point and consequently an indication should be provided to an operator/technician that the system has been isolated. In the present embodiment, such an indication is provided by first and second indicator lights 250 and 260, respectively. The first indicator light 250 is coupled in series, between the power supply 120 and the ground 130, with third and fourth normally-open contacts 270 and 280, respectively, and also a third pressure switch contact 290. The second indicator light 260 is coupled in series, between the power supply 120 and the ground 130, with a fourth pressure switch contact 300, and fifth and sixth normally-open contacts 310 and 320, respectively.

Each of the third and fifth normally-open contacts 270, 310 are actuated by the first coil 230, while each of the fourth and sixth normally-open contacts 280, 320 are actuated by the second coil 240. The third pressure switch contact 290 (which is part of the first pressure sensor 90) is closed when the first pressure sensor determines that pressure has fallen below its threshold, and the fourth pressure switch contact 300 (which is part of the second pressure sensor 95) is closed when the second pressure sensor determines that pressure has fallen below its threshold. Consequently, when the switch 110 is shut off such that the contact 180 is closed and the coils 230, 240 are energized, each of the third, fourth, fifth and sixth normally-open contacts 270, 280, 310 and 320 are closed. When the first and second pressure sensors 90, 95 eventually detect that there is low (or no) pressure, each of the contacts 290 and 300 close, thus allowing power to be delivered to each of the first and second indicator lights 250 and 260, which indicates that the valves 40,60 have been closed.

The control/monitoring system 100 allows for the detection of a faulty sensor as follows. Due to the design of the system 100, each of the sensors 90, 95 must transition from a state indicating that there is sufficient pressure in the third passage 70 to a state indicating that there is insufficient pressure in that passage, in order for the indicator lights 250, 260 to be turned on following the turning off of the switch 110. If, for example, the first sensor 90 is malfunctioning because the first pressure switch contact 210 has welded closed, the first indicator light 250 will not turn on following turning off of the switch 110 since the third pressure switch contact 290 will not be able to close. If the second sensor 90 is malfunctioning because the second pressure switch contact 290 has welded, then the second indicator light will not turn on. Thus, the system 400 will indicate that a fault has occurred, as well as indicate which sensor has malfunctioned. Also, if one of the sensors 90, 95 is malfunctioning due to the welding of one of the third and fourth pressure switch contacts 290, 300, then neither coil 230, 240 will be energized and so neither light 250, 260 will turn on.

Figure 2:
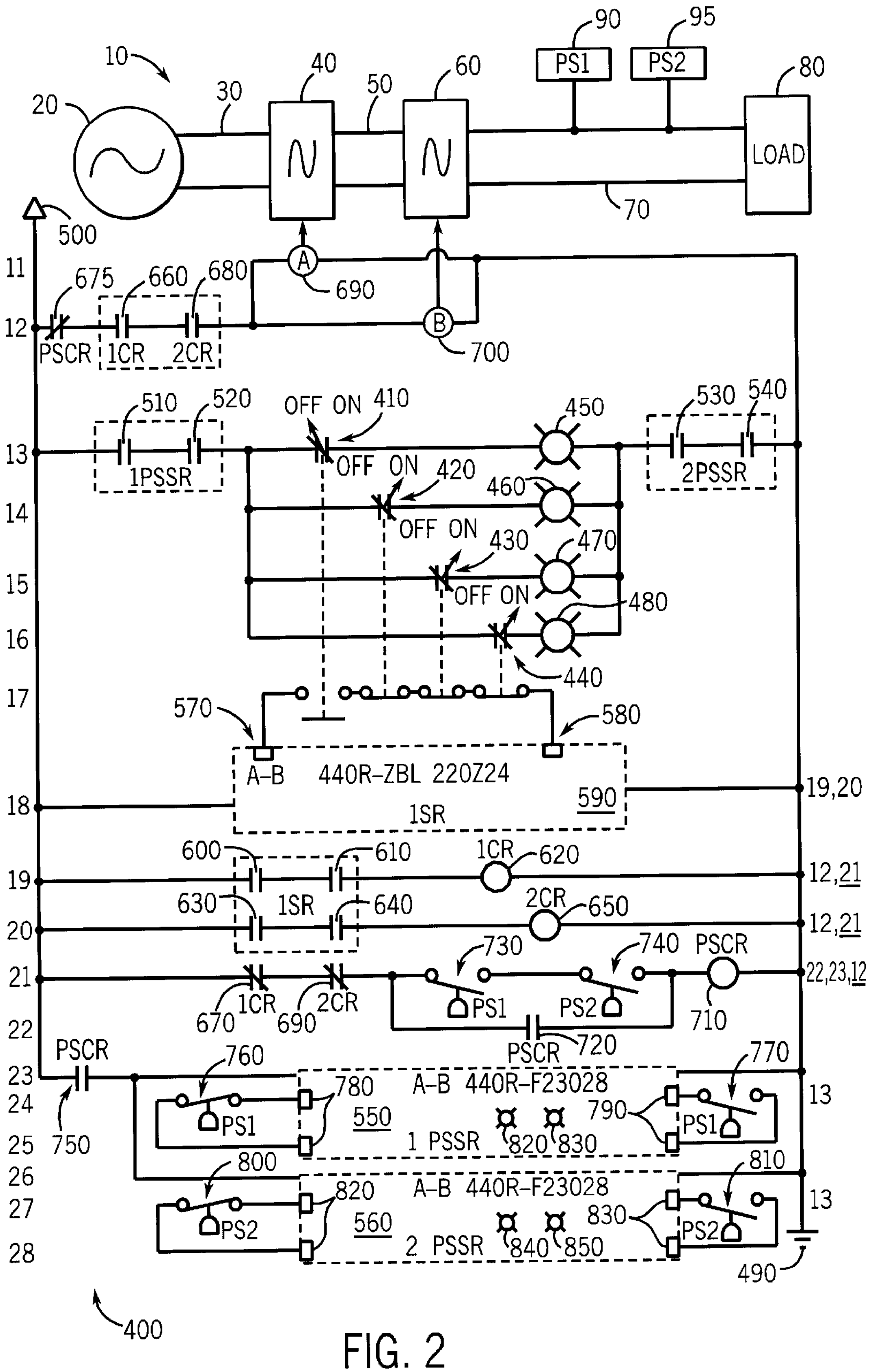
FIG. 2 is another ladder diagram showing a second embodiment of a valve control/monitoring system that avoids inaccurate indications of a valve being closed despite a sensor malfunction.

Referring to FIG. 2, the exemplary valve system 10 is shown to be controlled and monitored by a second control/monitoring system 400. The control/monitoring system 400, like the control/monitoring system 100, is designed to be able to provide an indication of whether the valves 40, 60 have been properly closed, such that a technician can appropriately access the system downstream of those valves and, in particular, is designed to avoid providing indications that the valves 40, 60 are closed when the valves are still open despite a malfunction in one of the pressure sensors 90, 95. In the embodiment shown, the control/monitoring system 400 has first, second, third and fourth on/off switches 410, 420, 430 and 440, respectively, that are coupled respectively in series with first, second, third and fourth indicator lights, 450, 460, 470 and 480. In alternate embodiments, the system 400 could include as few as one, or more than four (e.g., up to forty) different switches and corresponding indicator lights.

Each of the series combinations of the first switch 410 and first indicator light 450, second switch 420 and second indicator light 460, third switch 430 and third indicator light 470, and fourth switch 440 and fourth indicator light 480, is coupled additionally in series with first, second, third and fourth normally-open contacts 510, 520, 530 and 540 between a power source 500 and a ground 490. The first and second normally-open contacts 510 and 520 are part of a first safety relay 550 of the type A-B 440R-F23028 manufactured by the Allen-Bradley Company of Milwaukee, Wis. (or other comparable relay made by Allen-Bradley or other companies). Likewise, the third and fourth normally-open contacts 530 and 540 are part of a second safety relay 560 of the type A-B 440R-F23028 (or other comparable relay). Consequently, the first and second normally-open contacts 510 and 520 are closed when the first safety relay 550 is energized, while the third and fourth normally-open contacts 530 and 540 are closed when the second safety relay 560 is energized.

In the embodiment of FIG. 2, all of the first, second, third and fourth switches 410, 420, 430 and 440 are RLS switches that pertain to the system 10. When a technician or other person wishes to gain access to the system 10, the technician may access the system through any one of four doors (or other access points) corresponding to the four switches 410–440. When doing so, the technician or other person switches off the switch corresponding to that door. If the system 10 is to be accessed from multiple entry points (e.g., from more than one of the doors), more than one of the corresponding switches 410–440 will be turned from on to off. In alternate embodiments, different types of switches other than RLS switches (e.g., push/pull switches) can be employed. Typically, the number of switches used would correspond to the number of doors at which the system 10 can be accessed.

As shown, the first, second, third and fourth switches 410, 420, 430 and 440 are coupled in series between first and second ports 570 and 580 of a third safety relay 590, which is of the type A-B 440R-ZBL220Z24 manufactured by the Allen-Bradley Company (or other comparable relay made by Allen-Bradley or other companies). When any one or more of the switches 410–440 is switched off, the first port 570 is disconnected from the second port 580, causing the third safety relay 590 to be de-energized. As shown at lines 19 and 20 of the ladder diagram, the control/monitoring system 400 also includes fifth and sixth normally-open contacts 600 and 610 that are coupled in series with a first coil 620 between the power source 500 and the ground 490, and also seventh and eighth normally-open contacts 630 and 640 that are coupled in series with a second coil 650 between the power source and ground. The fifth, sixth, seventh and eighth normally-open contacts 600, 610, 630 and 640 are part of the third safety relay 590.

When the third safety relay 590 is energized, each of the normally-open contacts 600, 610, 630 and 640 are closed, causing each of the first and second coils 620, 650 to be energized. Upon the energizing of the first coil 620, a ninth normally-open contact 660 is closed and a first normally-closed contact 670 is opened. Upon the opening of the second coil 650, a tenth normally-open contact 680 is closed and a second normally-closed contact 690 is also opened. The ninth and tenth normally-open contacts 660 and 680 are coupled in series with first and second valve actuators 690 and 700, respectively, which cause the valves 40 and 60, respectively, to open and close. Consequently, when the first and second coils 620 and 650 are energized, the first and second valve actuators 690 and 700 (assuming normal operation) cause the valves 40 and 60 to close, respectively.

The first and second normally-closed contacts 670 and 690 are coupled in series with several additional elements in between the power source 500 and the ground 490. In particular, these additional elements are a third coil 710 and the parallel combination of an eleventh normally-open contact 720 and series-connected first and second pressure switch contacts 730 and 740, respectively. The first and second pressure switch contacts 730 and 740 are respectively part of the first and second pressure sensors 90 and 95, and are configured to be closed when the respective first and second pressure sensors 90 and 95 sense pressure within the third passage 70 above their respective thresholds and to open when the respective first and second pressure sensors do not sense sufficient pressure.

Further as shown in the ladder diagram of FIG. 2, at lines 23–28, the first and second safety relays 550 and 560 are each coupled in series within an additional normally-open contact 750 between the power source 500 and the ground 490. The additional normally-open contact 750 is governed by the operation of the third coil 710, such that when the coil 710 is energized, the contact 750 is closed. Likewise, the eleventh normally-open contact 720 is controlled based upon the upon the operation of the coil 710, such that when the coil 710 is closed, the normally-open contact 720 is closed. Further as shown, third and fourth pressure switch contacts 760 and 770 are respectively coupled to ports 780 and 790 of the first safety relay 550. Similarly, fifth and sixth pressure switch contacts 800 and 810 are respectively coupled to ports 820 and 830 of the second safety relay 560.

Each of the third and fourth pressure switch contacts 760 and 770 are part of the first pressure sensor 90, while each of the fifth and sixth pressure switch contacts 800 and 810 are part of the second pressure sensor 95. However, while each of the third and fifth pressure switch contacts 760 and 800 are designed to be closed when the respective first and second pressure sensors 90 and 95 do not sense sufficient pressure in the third passage 70, and to be opened when the first and second pressure sensors do sense sufficient pressure within the third passage, each of the fourth and sixth pressure switch contacts 770 and 810 are designed to be opened when the respective first and second pressure sensors 90 and 95 do not sense sufficient pressure within the third passage, and to be closed when the first and second pressure sensors respectively sense sufficient pressure within the third passage.

The first safety relay 550 is designed to be energized when all of three conditions are met, namely, the first safety relay receives power from the power source 500 (e.g., because the contact 750 is closed), the third pressure switch contact 760 is closed, and the fourth pressure switch contact 770 is opened. Likewise, the second safety relay 560 is configured to be energized when it receives power from the power source 500 (e.g., due to the closing of the contact 750), when the fifth pressure switch contact 800 is closed, and when the sixth pressure switch contact 810 is opened. As discussed above, when the first and second safety relays 550 and 560 are respectively energized, the respective pairs of normally-open contacts 510, 520, 530, and 540 are closed. Further, the first and second safety relays 550, 560 are provided with respective power indicator lights 820 and 840, which are turned on when the respective relays receive power by way of the contact 750, and with respective output indicator lights 830 and 850, which are turned on when the respective relays are energized.

Given this design, the control monitoring system 400 typically operates as follows. Assuming that each of the switches 410–440 is switched to its on position, none of the indicator lights 450–480 is on and the connection between ports 570 and 580 of the third safety relay 590 is short-circuited. Consequently, the third safety relay 590 is energized, causing each of the contacts 600, 610, 630 and 640 to be closed, which in turn causes each of the first and second coils 620, 650 to be energized. The energizing of the coils 620 and 650 causes the normally-open contacts 660, 680 to be closed, such that power is delivered to each of the actuators 690, 700, which cause the valves 40 and 60 to be opened, and thus allow pressure to be delivered to the load 80.

When in this state, the energizing of the first and second coils 620, 650 also causes the opening of the normally-closed contacts 670 and 690, which guarantees that the third coil 710 is de-energized even though both of the pressure switch contacts 730 and 740 should be closed in response to the sensing of pressure by the first and second pressure sensors 90 and 95. Because the third coil 710 is de-energized, both the contact 720 and the contact 750 are open-circuited. Due to the open-circuiting of the contact 750, each of the first and second safety relays 550 and 560 is de-energized, which in turn causes each of the contacts 510, 520, 530 and 540 to be open-circuited, which further guarantees that the indicator lights 450–480 are not on.

Once one or more of the switches 410–440 are switched off, the connection between ports 570 and 580 is broken, causing the third safety relay 590 to be de-energized. The de-energizing of the third safety relay 590 causes each of the fifth, sixth, seventh and eighth normally-open contacts 600, 610, 630 and 640 to be open-circuited, which in turn causes the first and second coils 620 and 650 to be de-energized. The de-energizing of the coils 620, 650 in turn causes the normally-open contacts 660, 680 to be open-circuited, which causes the valve actuators 690, 700 to be de-energized and should cause the valves 40 and 60 to be closed. The de-energizing of the first and second coils 620 and 650, respectively, also causes the closing of the first and second normally-closed contacts 670 and 690. Despite the closing of the valves 40 and 60, the pressure within the third passage 70 does not instantaneously drop off; rather, the pressure remains sufficient for a short period of time such that the first and second pressure switch contacts 730 and 740 remain closed for a short period of time after the closing of the first and second normally-closed contacts 670 and 690. Consequently, the third coil 710 is energized by way of the first and second pressure switch contacts 730 and 740 briefly, which causes the normally-open contact 720 to be closed. Then, as the pressure within the third passage 70 drops off and the pressure switch contacts 730 and 740 open in response to the lower pressure sensed by the first and second pressure sensors 90 and 95, the third coil 710 nevertheless remains energized by way of the contact 720.

The energizing of the third coil 710 also causes the opening of a further normally-closed contact 675 that is coupled in series with the contacts 660,680 (which further confirms the shutting off of the actuators 690,700) and causes the closing of the contact 750, such that the first and second safety relays 550, 560 each receive power. Once the first and second pressure sensors 90 and 95 determine that the pressure within the third passage 70 has fallen sufficiently, the third pressure switch contact 760 closes, the fourth pressure switch contact 770 opens, the fifth pressure switch contact 800 closes, and the sixth pressure switch contact 810 opens. When all of these things occur, the first and second safety relays 550 and 560 are energized, causing the contacts 510, 520, 530 and 540 to be closed. Consequently, when all of these things have occurred, one or more of the indicator lights 450–480 are turned on in correspondence with those of the switches 410–440 that have been switched off.

The control/monitoring system 400 provides both additional redundancy to guarantee proper operation of the system despite the failure of a single component, as well as monitoring capability that allows for the failure of a single component to be detected and allows for the identity of a failed component to be determined. In particular, if one of the pressure sensors 90, 95 has welded such that one of the pressure switch contacts 730, 740, 760, 770, 800 and 810 always remains closed, the control/monitoring system 400 allows that fault to be detected and (in many cases) the identity of the fault to be determined.

For example, if the pressure switch contact 740 is welded closed, then the pressure switch contact 800 is forced to remain open while the pressure switch contact 810 is forced to remain closed, and the pressure sensor 95 is forced to remain in a position indicating that there is pressure within the third passage 70 (because of mechanical coupling). When one of the switches 410–440 is switched off, the third safety relay 590 is de-energized and consequently the first, second and third coils 620, 650 and 710 are energized, such that the contact 750 is closed. Nevertheless, despite the closing of the contact 750, the second safety relay 560 will not be energized because the sixth pressure switch contact 810 will remain in a closed position and the fifth pressure switch contact 800 will remain in an open position. Consequently, the third and fourth normally-closed contacts 530 and 540 will remain open, such that the indicator light 450 will not turn on. Thus, a technician or other person involved with the system (or a monitoring system such as a computer system) has information indicating that a fault has occurred. Additionally, while the power indicator light 820 of the first safety relay 550 does turn on, the output indicator light 830 does not. Thus, the system 400 also allows for it to be determined that it is the second pressure sensor 95 that is malfunctioning.

Conversely, if the second pressure sensor 95 is welded in a position corresponding to insufficient pressure within the third passage 70, the pressure switch contact 740 remains in an open state. Consequently, when one or more of the switches 410–440 is switched off, and the third safety relay 590 is de-energized, the third coil 710 nevertheless cannot be energized. As a result, neither of the first and second safety relays 550, 560 is energized such that any of the indicator lights 450–480 can be turned on. Additionally, neither of the power indicator lights 820, 840 of the first and second relays 550, 560 is energized since the normally-open contact 750 cannot be closed, further confirming the sensor malfunction. Similarly, based upon the functioning of the indicator lights 440–480 and 820–850, malfunctions in the first pressure sensor 90 can also be detected and identified.

In alternate embodiments, the control/monitoring systems 100,400 shown in FIGS. 1 and 2 can be modified from the specific embodiments shown. Certain alternate embodiments may be simplified versions of the systems 100,400 (e.g., the system of FIG. 1 could be modified to include only one of the indicator lights 250,260). Also, some alternate embodiments could include additional status indicators, contacts and/or coils, to provide further information regarding the pressure sensors (or other devices) that may be malfunctioning, and the type of malfunction. For example, while the control/monitoring systems 100,400 of FIGS. 1 and 2 are able to indicate the presence of a pressure sensor malfunction when one of the pressure switch contacts 210, 220,730,740 is stuck open, the systems are not able (in the event of such a failure) to indicate which of the pressure sensors has failed. Thus, in certain alternate embodiments, the pressure switch contacts 210,220 of FIG. 1 (or the pressure switch contacts 730,740 of FIG. 2) are separated so that the contacts are not in series with one another. In such embodiments, particularly where additional status indicators (e.g., lights) are employed, the control/monitoring systems are able to determine which of the contacts 210,220 (or 730,740) has become stuck open.

It is specifically intended that the present invention not be limited to the embodiments and illustrations contained herein, but that modified forms of those embodiments including portions of the embodiments and combinations of elements of different embodiments also be included as come within the scope of the following claims. The present invention is intended to encompass a variety of control/monitoring systems other than those shown in FIGS. 1 and 2 that can be employed to control one or more valves, to monitor valve status, to determine when a fault has occurred in a monitoring device, to identify the malfunctioning component, and to avoid providing false indications of valve status when such a malfunction has occurred. The present invention is also applicable to a variety of valve systems and similar systems in which it is desired to monitor a flow-governing device's operation by way of a sensor or other monitoring component. The control/monitoring systems can be made up of discrete electrical components such as contacts, relays, coils, etc., or can operate by way of (or in combination with) other components or software (implemented on devices such as a microprocessor, a programmable logic controller, programmable logic devices, or other devices) that provides the same or similar functionality.

We claim:

1. A system for controlling and monitoring the operation of a valve, the system comprising:

a valve actuator;

a switch that, upon being actuated, provides a control signal to the valve actuator designed to cause the valve to change from a first valve state to a second valve state;

a first sensor positioned downstream of the valve;

a first output indicator; and a sensor failure detecting device coupled at least indirectly to the switch, the first sensor and the first output indicator, wherein, when not detecting a sensor failure, the sensor failure detecting device allows the first output indicator to indicate that the valve has changed from the first valve state to the second valve state in response to the switch being actuated when the sensor indicates that the valve has so changed; and wherein, upon detecting a sensor failure, the sensor failure detecting device prevents the output indicator from indicating that the valve has changed from the first valve state to the second valve state in response to the switch being actuated.

2. The system of claim 1, wherein the first output indicator is one of an indicator light and an alarm sound, wherein the switch is one of an RLS switch, a push-button switch, and a trigger, wherein the valve actuator is a solenoid, and wherein in the first valve state the valve is open and in the second valve state the valve is closed.

3. The system of claim 1 wherein, upon detecting a sensor failure, at least one of the sensor failure detecting device and the first output indicator provides information indicating that the sensor failure has occurred, and wherein, the sensor failure detecting device detects that a sensor failure has occurred by detecting at least one of an improper sensor state when the switch is actuated and a failure of the sensor to switch in its state after the switch is actuated.

4. The system of claim 3, further comprising a second sensor positioned downstream of the valve and wherein, upon detecting a sensor failure, at least one of the sensor failure detecting device and the first output indicator provides information indicating an identity of the sensor that has failed.

5. The system of claim 2, further comprising a second sensor and wherein, absent a sensor failure, each of the first and second sensors switches to a first sensor state when fluid pressure sensed by the respective sensor is above a respective threshold, and switches to a second sensor state when the fluid pressure sensed by the respective sensor is below the respective threshold.

6. The system of claim 5, wherein each of the first and second sensors includes first and second contacts, wherein when each respective sensor is in its first sensor state, its respective first contact is closed and its respective second contact is open, and when each respective sensor is in its second state, its respective first contact is open and its respective second contact is closed.

7. The system of claim 6, wherein the sensor failure detecting device includes a first coil that is energized upon the switch being actuated if the first contacts of both of the first and second sensors are closed, and wherein the sensor failure detecting device further includes a circuit component that keeps the first coil energized even though the first contacts of the first and second pressure sensors are subsequently opened.

8. The system of claim 7 wherein, absent a sensor failure, the respective first contacts of the first and second sensors are closed when the pressure sensed by the first and second sensors is above their respective thresholds, the respective first contacts are open when the pressure sensed by the respective sensors is below their respective thresholds, the respective second contacts are open when the pressure sensed by the respective sensors is above their respective thresholds, and the respective second contacts are closed when the pressure sensed by the respective sensors is below their respective thresholds.

9. The system of claim 8, further comprising a second output indicator that is coupled at least indirectly to the sensor failure detecting device, and a second coil that is energized that is energized upon the switch being actuated if the first contacts of both of the first and second sensors are closed, and wherein the sensor failure detecting device further keeps the second coil energized even though the first contacts of the first and second sensors are subsequently opened.

10. The system of claim 9, wherein upon the energizing of the first coil and closing of the second contact of the first sensor, the first output indicator indicates that the valve is in the second valve state, and wherein upon the energizing of the second coil and closing of the second contact of the second sensor, the second output indicator indicates that the valve is in the second state.

11. The system of claim 10 wherein, when the first sensor is welded so that its first contact remains closed, the first output indicator does not indicate that the valve is in the second valve state despite the energizing of the first coil, and thus a first indication is provided that the first sensor has failed;

wherein, when the second sensor is welded so that its first contact remains closed, the second output indicator does not indicate that the valve is in the second valve state despite the energizing of the second coil, and thus a second indication is provided that the second sensor has failed; and wherein, when at least one of the first and second sensors is welded so that its respective second contact remains closed, neither of the first and second coils is energized and neither of the first and second output indicators indicates that the valve is in the second valve state, and thus an indication is provided that one of the sensors has failed.

12. The system of claim 8, wherein the sensor failure detecting device further includes first and second safety relay circuits, wherein each of the first and second sensors includes a respective third contact that is closed when the pressure sensed by the respective sensor is above its respective threshold and is open when the pressure sensed by the respective sensor is below its respective threshold, and wherein the first safety relay circuit is coupled to the second and third contacts of the first sensor and the second safety relay circuit is coupled to the second and third contacts of the second sensor.

13. The system of claim 12, wherein the first and second safety relay circuits are powered when the first coil is energized, and wherein each of the first and second safety relay circuits includes a respective power indicator that provides a respective power indication when the respective safety relay circuit is powered.

14. The system of claim 13, wherein each of the first and second safety relay circuits includes a respective output indicator that provides a respective output indication when the respective safety relay circuit is energized;

wherein the first and second safety relay circuits are respectively energized when the respective second contacts coupled to the respective relay circuits are closed, the respective third contacts coupled to the respective relay circuits are opened, and the respective relay circuits are powered; and wherein the output indicator indicates that the valve is in the second state when both of the first and second safety relays are energized.

15. The system of claim 14, wherein when any of the first and third contacts of the first sensor are welded closed, the output indicator of the first safety relay cannot be energized despite the safety relay being powered, and consequently the output indicator does not provide its output indication, thus indicating that the first sensor has failed; and wherein when any of the first and third contacts of the second sensor are welded closed, the output indicator of the second safety relay cannot be energized despite the safety relay being powered, and consequently the output indicator does not provide its output indication, thus indicating that the second sensor has failed.

16. The system of claim 15, wherein when one of the second contacts of the first and second sensors is welded closed, the first coil cannot be energized, and consequently neither of the power indicators of the first and safety relays provides the power indication, thus indicating a failure of at least one of the sensors; and wherein when any of the first, second and third contacts is welded closed, at least one of the first and second safety relays cannot be energized and consequently the first output indicator does not indicate that the valve is in the second state.

17. The system of claim 1, further comprising a plurality of additional switches, a plurality of additional output indicators, and a safety relay circuit;

wherein each switch is coupled in series with a respective one of the output indicators;

wherein each switch and output indicator corresponds to a respective access panel by which it is possible to gain access to the valve; and wherein, when any of the switches is actuated to a respective off state, the safety relay circuit becomes de-energized, which causes the control signal to be provided to the valve actuator.

18. A system comprising:

a flow-governing device;

an actuator for controlling a status of the flow-governing device;

first and second sensors that operate to sense the status of the flow-governing device;

means for receiving commands to change the status of the flow-governing device, for providing a control signal to the actuator in response to the received commands, for receiving signals from the sensors, for detecting when a sensor malfunction has occurred, and for providing at least one output indication indicative of the sensor malfunction when the sensor malfunction has occurred.

19. The system of claim 18, wherein the means additionally is for turning on an indicator light when the means receives a command to switch off the flow-governing device and the means does not detect any sensor malfunction, and wherein the at least one output indication is an absence of the indicator light being turned on when the means receives the command to switch off the flow-governing device.

20. A method of monitoring whether a valve has been shut off in response to a command, the method comprising:

causing at least one switching element of an electric circuit to change a state in response to the command;

energizing a coil in response to the changing of the state of the at least one switching element, wherein the energizing of the coil only occurs if a sensor component is in a first position indicating that the valve has not been shut off;

energizing an indicator light in response to the energizing of the coil, wherein the energizing of the indicator light only occurs if the sensor component switches, subsequent to the energizing of the coil, from the first position to a second position indicating that the valve has been shut off.

* * * * *